United States Patent Office 3,410,687
Patented Nov. 12, 1968

3,410,687
PHOTOSENSITIVE MEDIUM COMPRISING AN AROMATIC PROTECTED ALDEHYDE, A PRIMARY AROMATIC AMINE AND A LOWER HALOALKANE
John Alan Mattor, Hollis, and Lawrence Price, Old Orchard Beach, Maine, assignors to Scott Paper Company, Delaware County, Pa., a corporation of Pennsylvania
No Drawing. Continuation-in-part of application Ser. No. 626,881, Mar. 29, 1967, which is a continuation-in-part of application Ser. No. 351,316, Mar. 12, 1964. This application Oct. 19, 1967, Ser. No. 676,637
6 Claims. (Cl. 96—90)

ABSTRACT OF THE DISCLOSURE

A photographic medium or film comprises a light-passing resinous binder containing as active ingredients (1) an aromatic protected aldehyde such as an aromatic cyclic acetal substituted on the benzene ring with at least one chromophoric group, (2) a primary aromatic amine and (3) a photosensitive lower haloalkane such as iodoform.

The medium, after being exposed to light, is developed or fixed simply by heating it which heating drives off enough of the chemicals in the background areas so that the background areas are no longer light sensitive.

Related applications

This application is a continuation-in-part of Ser. No. 626,881, "Heat Development of Photographic Plate Containing Volatile Photosensitizer," filed Mar. 29, 1967, by the present inventors, which in turn was a continuation-in-part of Ser. No. 351,316, now abandoned, "Photosensitive Medium Comprising a Furfurylidene, a Primary Aromatic Amine and a Lower Haloalkane," filed Mar. 12, 1964.

Background of the invention

Application Ser. No. 351,316 discloses a photographic medium in which, under the influence of light and then heat, a furfural derivative, having a protected aldehyde structure is caused to react with a primary aromatic amine under the influence of a photosensitive haloalkane in such a manner that there is cleavage of the furan ring, and also of the protected aldehyde group to yield a complex Stenhouse dye structure that gives good dark or black images.

This invention

It has now been found that the aromatic protected aldehyde type of structures, absent a furan ring, will react with primary aromatic amines when activated by photosensitive lower haloalkanes in a suitable plastic binder to produce dye structures of a wide variety of brilliant hues and colors, e.g., yellows, reds, greens and violets. These dye structures are Schiff bases, or their acid salts, and are therefore fundamentally different from the Stenhouse dye structures of the previous application, Ser. No. 351,316.

In brief compass, this invention is a photographic medium, especially in the form of a film applied from solvent solution, comprising a light-passing binder containing dispersed therein in photographic amounts and proportions:
(a) A photosensitive lower haloalkane, e.g., iodoform,
(b) A primary aromatic amine, e.g., 3,3'-dimethoxy benzidene, (c) An aromatic dye precursor having the structure:

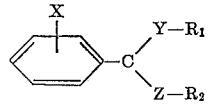

wherein as indicated at X, the benzene ring contains at least one chromophoric group, which group is preferably in other than the ortho position. Y and Z can be oxygen, sulfur or nitrogen radicals, provided only one of them be a nitrogen. $R_1$ and $R_2$ are organic radicals such as aryl or alkyl radicals of preferably from 1 to 20 carbon atoms. $R_1$ and $R_2$ preferably jointly form a cyclic acetal structure:

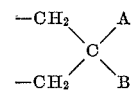

A and B are any suitable radicals such as alkyl radicals having from 1 to 20 carbon atoms.

Generally, those primary aromatic amines that perform well in the photographic medium of the previous application, Ser. No. 351,316, work well in the present invention. While the benzene ring thereof can have additional substituents, it is preferred that a hydrogen occupy at least one position on the ring and in the case of the meta phenylene diamines that this position be para to a nitrogen group. The diamines are preferred, with the benzene ring preferably having at least one additional substituent.

The Schiff type dyes are produced in the photographic medium apparently by the action of an acid or acid moiety, produced from the haloalkane when it is exposed to light followed by heating, on the acid-sensitive aldehyde derivative to form an azo-methine (Schiff base) linkage. The haloalkane is believed to exist as a complex with the primary aromatic amine prior to exposure to light.

Other than the difference in the dye precursor that is used, the present photographic medium is similar to that of the previous application, Ser. No. 351,316, and is used in the same manner, i.e., the two photographic mediums can be applied to or impregnated within the same type of substrates, clear or opaque, from solvent solutions containing suitable binders. The exposure and heat development conditions are the same.

The images produced are brilliantly colored and have good density. The resolution of the medium is high. Image stability is good and the backgrounds are clear, which gives good contrast.

Preferred embodiments

The table illustrates the chemical structures of suitable protected aldehydes. Of these, the cyclic acetals might be said to be preferred both from the standpoints of their ease of preparation and their performance. It will be noted that all compounds have a auxochromic group such as $-NO_2$, $-Cl$, $-OH$ or dialkyl amino radicals attached to the benzene nucleus in either the meta or para position. In some cases the benzene ring is substituted more than once, in which case the other positions can be occupied.

Preferably the dye precursor is a crystalline solid at room temperature and has a melting point in the range of 40° to 225° C. It must of course be soluble in a suitable solvent system to permit it to be applied to a support with the other chemicals and the binder.

Examples (1) Compound 1, 0.1 g.; 4-aminodiphenylamine, 0.1 g.; and iodoform, 0.2 g. were dissolved in 6 ml. of 10% polystyrene in chloroform. This was coated on both subbed Mylar[1] film and subbed paper. After drying, the plates yielded red images on exposure to a carbon arc through a negative in contact therewith followed by heating to 150° C. for 1.5 minutes.

(2) A coating formulation was prepared as in Example 1 using m-phenylenediamine in place of the 4-aminodiphenylamine. A green image resulted.

(3) Compound 2 was formulated in amounts ranging from 0.04 g. to 0.1 g., with iodoform ranging from 0.1 to 0.2 g., in 4.0 ml. of 10 to 15 percent polystyrene, with the following amines:

| Amine | Amount, g. | Color of Image |
| --- | --- | --- |
| 2,4-diaminoethoxybenzene | 0.06 | Rich brown. |
| 3,3'-dimethoxybenzidine | 0.08 | Brilliant orange. |
| 2,4-diaminochlorobenzene | 0.1 | Bright yellow. |
| 4-aminodiphenylamine | 0.1 | Bright red. |

The formulations were coated on a solvent hold-up base paper, exposed to develop them and were fixed by heating.

(4) Purple images were made by formulating 4-aminodiphenylamine with Compound 8 in the manner indicated in the above examples.

(5) The following formulation gave vivid red-brown images:

Iodoform _____g__ 0.15
4-aminodiphenylamine _____g__ 0.10
Compound 13 _____g__ 0.10
Polystyrene (10%) in CHCl$_3$ _____ml__ 10

It was coated on subbed paper with a #20 Mayer bar, dried and exposed 15 seconds to a 7.7 k.v.a. carbon arc at 18 inches. The exposed sheet was developed and fixed by heating. It gave a 10 step exposure on a conventional Stauffer step wedge.

(6) A plate was prepared from the following:

Compound 6 _____g__ 0.16
4-aminodiphenylamine _____g__ 0.2
Iodoform _____g__ 0.4
Polystyrene (10%) in CHCl$_3$ _____ml__ 16

It was coated with a #20 Mayer bar on a subbed paper base, exposed for 15 seconds to a 7.7 k.v.a. carbon arc at 18 inches through a negative in contact therewith, then heated to 270° F. in a circulating air oven for 1.5 minutes. The image was red-black.

(7) A transparency was prepared by coating a Mylar sheet, subbed with isotactic polystyrene, with Compound 4 _____g__ 0.10
3,3'-dimethoxybenzidine _____g__ 0.20
Iodoform _____g__ 0.4
Polystyrene (10%) in CHCl$_3$ _____ml__ 16

It was exposed for 35 seconds on the same arc as above and heated in the same way.

Satisfactory images have been obtained from a variety of resinous binders, using various formulations of active ingredients of the type above. Butvar (Monsanto), Vitel PE200 (Goodyear), VYHN (a vinyl chloride acetate copolymer by Union Carbide), Lucite 2009 (duPont), PPO (General Electric) all give useful results.

(8) Lacquer type coating mixtures were prepared with the following composition:

Polystyrene (Dow S-666 U) _____g__ 0.6
Iodoform _____g__ 0.1
Compound 1 _____g__ 0.1
Chloroform _____ml__ 6
Amine:
  (1) When one used _____g__ 0.1
  (2) When two used (each) _____g__ 0.07

The coatings were formed on a paper which had a base-coat of polyvinyl alcohol-titanium dioxide for solvent hold-out using a number 16 Mayer-rod. The sheets were air-dried, and imaged for 15 seconds with a 7.7 k.v.a. carbon arc at 18 inches distance. A step-wedge was used to vary the exposure. Development and fixation were accomplished by heating in a circulating air oven for 1.5 minutes at 150° C.

The following results were obtained with the amines indicated:

| Amine | Results |
| --- | --- |
| (1) Blank (none) | Faint pinkish image. |
| (2) p-Bromo aniline | Bright yellow. |
| (3) 4,4'-thiodianiline | Bright orange. |
| (4) 4,4'-dithiodianiline | Bright yellow-orange. |
| (5) 4,4'-sulfonyldianiline | Mustard (weak). |
| (6) 5-methyl-2,4-toluenediamine | Yellowish gray. |
| (7) m-Toluidine | Mustard. |
| (8) o-Anisidine | Yellowish gray. |
| (9) p-Chloroaniline | Gray. |
| (10) 3,5-diamino-4-chlorotoluene | Bright orange. |
| (11) 2-fluoro-p-phenylenediamine | Do. |
| (12) 1-ethoxy-2,4-diaminobenzene | Brown. |
| (13) p-Chlorophenoxy-2,4-diaminobenzene | Orange-brown. |
| (14) Dodecylmercapto-2,4-diaminobenzene | Do. |
| (15) 1-styryl-2,4-diaminobenzene | Orange. |
| (16) 2,2'-dichloro 5,5' dimethoxybenzidine | Do. |
| (17) O-tolidine | Orange-brown. |
| (18) 1-chloro-2,4-diaminobenzene | Orange-green. |
| (19) 4,4' oxydianiline | Bright yellow. |
| (20) 2,6-dichloro-p-phenylenediamine | Bright orange. |
| (21) 4,4' methylenedianiline | Mustard-yellow. |
| (22) 1-isopropyl-2,4-diaminobenzene | Olive. |
| (23) 3,3' dimethoxybenzidine | Intense carmine. |
| (24) 1-chloro-2,4-diaminobenzene | Orange-brown. |
| (25) N-phenyl-p-phenylenediamine | Intense carmine. |
| (26) 4,4' diaminodiphenylamine | Deep purple-brown. |
| (27) 2,6-dibromo-p-phenylenediamine | Good sepia. |
| (28) 2-bromo-p-phenylenediamine | Do. |
| (29) m-Phenylenediamine | Olive green. |
| (30) 2,4-toluenediamine | Do. |
| (31) 2,6-dichloro-p-phenylenediamine; 2,4,6 tribromo 1,3-phenylene-diamine. | Grayish-orange. |
| (32) 2,6-dichloro-p-phenylenediamine; 3,5 dibromo-2,4-toluenediamine. | Orange. |
| (33) 2,6 dichloro-p-phenylenediamine; 3,3' dimethoxybenzidine. | Intense carmine. |
| (34) 3,5 dibromo 2,4-toluenediamine; 4,4' oxydianiline. | Olive green. |
| (35) 3,5 dibromo 2,4-toluenediamine; N-phenyl p-phenylenediamine. | Deep carmine. |
| (36) 3,5 dibromo 2,4-toluenediamine 3,3' dimethoxy benzidine. | Carmine. |
| (37) N-phenyl-p-phenylenediamine 2,6-dibromo-p-phenylenediamine. | Do. |
| (38) N-phenyl-p-phenylenediamine 2,4,6-tribromo-1-3,-phenylene-diamine. | Do. |
| (39) N-phenyl-p-phenylenediamine 4,4'-thiodianiline. | Mustard-orange. |

[1] E. I. du Pont de Nemours Company's polyethylene terephthalate resin.

REPRESENTATIVE AROMATIC DYE PRECURSORS OF THE PROTECTED ALDEHYDE TYPE

| Structure | | Melting point, ° |
| --- | --- | --- |
| 1 | (CH$_3$)$_2$N—⟨O⟩—CH(O—CH(CH$_3$)—C(CH$_3$)$_2$—O—CH) <br> 2(4-dimethylaminophenyl)-4,5,5-trimethyl-1,1,3-dioxane | 76–77.5. |
| 2 | (CH$_3$)$_2$—N—⟨O⟩—CH(O—CH$_2$—C(CH$_3$)(NO$_2$)—O—CH$_2$) | 162–164. |

REPRESENTATIVE AROMATIC DYE PRECURSORS OF THE PROTECTED ALDEHYDE TYPE—Continued

| Structure | Melting Point ° |
|---|---|
| 3 | 200–202. |
| 4 | 185.5–187. |
| 5 | 76–78. |
| 6 | 83–87. |
| 7 | 55–56. |
| 8 | 48–50. |
| 9 | White needles, 134–136. |
| 10 | 130–135. |
| 11 | 168–172. |
| 12 | 170°/30 mm. |
| 13 | 44–45.5. |
| 14 | White leaflets; melt near room temperature. |

We claim:
1. A photographic medium comprising a light-passing binder containing dispersed therein in photographic amounts and proportions:
 (a) a photosensitive lower haloalkane,
 (b) a primary aromatic amine,
 (c) an aromatic dye precursor having the structure:

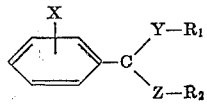

wherein as indicated at X, the benzene ring contains at least one auxochromic group in other than the ortho position selected from the group consisting of —$NO_2$, Cl, —OH, and dialkyl amino radicals, Y and Z are selected from the group consisting of oxygen, sulfur and nitrogen radicals, provided only one of them be a nitrogen, and $R_1$ and $R_2$ are selected from the group consisting of aryl and alkyl radicals having in the range of 1 to 20 carbon atoms each, said dye precursor having a melting point in the range of 40° to 225° C.

2. The photographic medium of claim 1 wherein X is —$NO_2$ in the meta position.

3. The photographic medium of claim 1 wherein Y and Z are oxygen radicals and $R_1$ and $R_2$ jointly form:

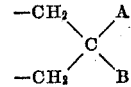

such that said dye precursor is a cyclic acetal, and wherein A and B are individually selected from the group consisting of —NO$_2$, alkyl radicals having in the range of 1 to 20 carbon atoms and

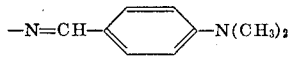

4. The photographic medium of claim 1 wherein Y and Z are oxygen radicals and R$_1$ and R$_2$ jointly form:

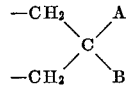

such that said dye precursor is a cyclic acetal, and wherein A and B are

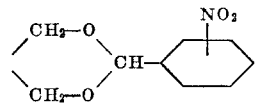

5. The photographic medium of claim 1 wherein said lower haloalkane is iodoform.

6. The photographic medium of claim 3 wherein said primary aromatic amine is a metaphenylene diamine which if substituted contains at least one hydrogen on the ring in the para position, and wherein said lower haloalkane is iodoform.

References Cited

UNITED STATES PATENTS 2,680,731   6/1954   Martin _____ 96—100
2,680,732   6/1954   Martin _____ 96—100

NORMAN G. TORCHIN, *Primary Examiner.*

C. E. DAVIS, *Assistant Examiner.*

UNITED STATES PATENT OFFICE
CERTIFICATE OF CORRECTION

Patent No. 3,410,687            November 12, 1968

John Alan Mattor et al.

It is certified that error appears in the above identified patent and that said Letters Patent are hereby corrected as shown below:

Column 1, line 68, "benzidene" should read -- benzidine -- lines 2 to 5, the formula should appear as shown below:

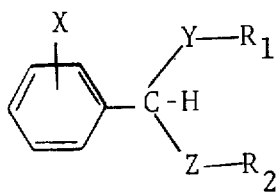

Columns 3 and 4, structure No. 1, the formula should appear as shown below:

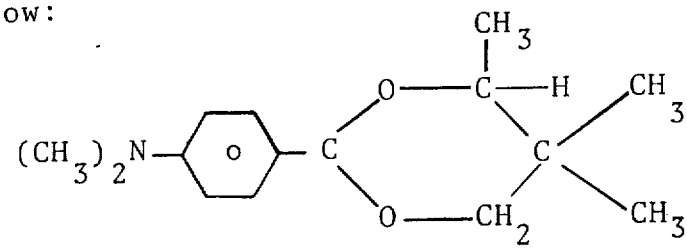

2(4'-dimethylaminophenyl)-4,5,5-trimethyl-1,3-dioxane

Columns 5 and 6, formula No. 10, should appear as shown below:

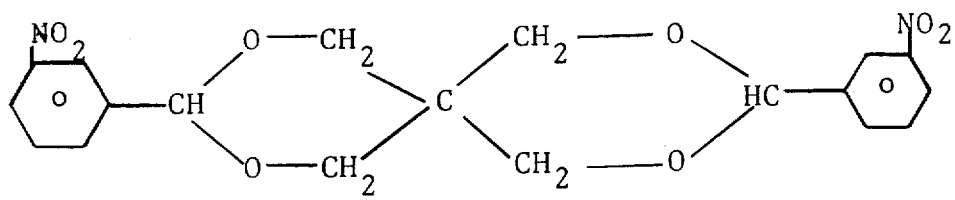

(2)

Column 5, lines 66 to 70, the formula should appear as shown bel

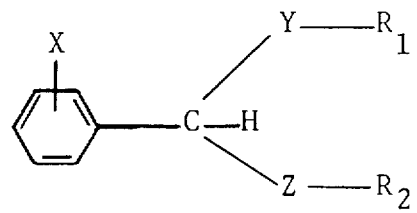

same column 5, line 75, "Cl," should read -- Cl-, --.

Signed and sealed this 16th day of February 1971.

(SEAL)
Attest:

EDWARD M. FLETCHER, JR.
Attesting Officer

WILLIAM E. SCHUYLER, JR
Commissioner of Patents